Nov. 7, 1967  F. MACHATE  3,350,959
CABLE OR CONDUIT ASSEMBLY
Filed April 29, 1965
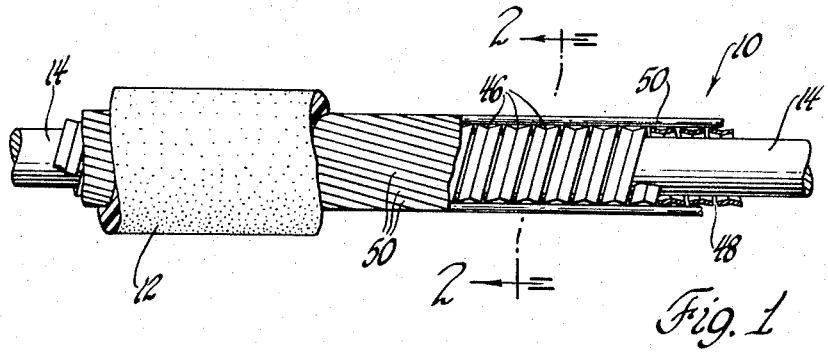
Fig. 1
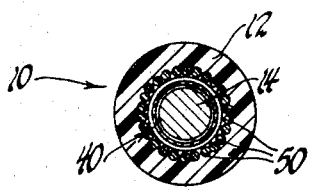
Fig. 2
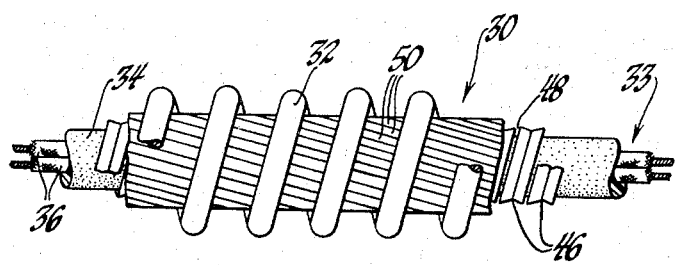
Fig. 3
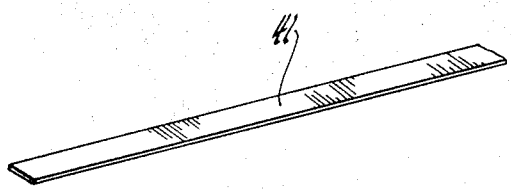
Fig. 4
Fig. 5
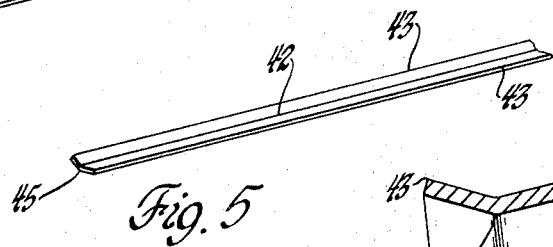
Fig. 6
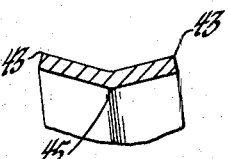
Fig. 7
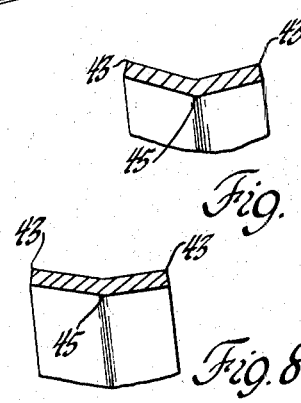
Fig. 8
INVENTOR.
Fred Machate
BY Barnard, McGlynn & Reising
ATTORNEYS

United States Patent Office 3,350,959
Patented Nov. 7, 1967

3,350,959
CABLE OR CONDUIT ASSEMBLY
Fred Machate, Lansdale, Pa., assignor to Teleflex Incorporated, North Wales, Pa., a corporation of Delaware
Filed Apr. 29, 1965, Ser. No. 451,805
27 Claims. (Cl. 74—501)

ABSTRACT OF THE DISCLOSURE

A flexible member of the type utilized as a cable or a conduit and, more particularly, a strip having a substantially V-shaped cross section wound with a relatively short lead to form a tubulous member having a substantially constant minimum inner diameter and a variable maximum outer diameter which is utilized in fabricating such a flexible member.

---

Various structures have heretofore been utilized as cables or conduits.

Many forms of substantially tubular members have heretofore been utilized as conduits to support means within the conduit or to provide a passageway for means to flow through the conduit. Typical of such conduits are those utilized to support motion transmitting core elements for remote control purposes. Normally, such conduits are stationary while the motion transmitting core element is disposed for movement within the conduit.

Many forms of substantially tubular members are also utilized as cables. Such cables frequently surround and support flow conducting means, such as a fluid conveying tube or electrical lead wires, and the like. Such cables are normally moved longitudinally of themselves in order to move the flow conducting means. For example, such cables are frequently utilized to move electrical instrumentation leads into particular environments for measurement purposes.

Substantially tubular shaped cables and conduits of this type are normally formed and means, such as a motion transmitting core element or a flow conducting means, is inserted into the substantially tubular conduit or cable. A typical method of making such a cable or conduit is to wrap a plurality of filaments helically about a substantially tubular member with a relatively long lead. If the assembly is to be utilized as a conduit, a casing of plastic, or the like, is normally formed about the helically wound filaments. When the assembly is to be utilized as a cable, a wire is frequently helically wound about the filaments with a relatively short lead to present spaced convolutions providing tooth elements which are cooperable with gear means, or the like, to move the cable longitudinally.

Whether the assembly is to be utilized as a conduit or a cable, it is very important and necessary to maintain the inner diameter thereof substantially constant so that the motion transmitting core element or flow conducting means, or the like, may be easily inserted into the cable or conduit without excessive radial forces being applied to the motion transmitting core element or flow conducting means once they are disposed within the conduit or cable. Heretofore, during the fabrication process of such cables and conduits, it has been very difficult to maintain the inner diameter substantially constant. For example, in the fabrication of the type cable or conduit using a substantially tubular inner member wound with helically disposed filaments on a relatively long lead, it frequently occurs that the inner diameter of the substantially tubular member is decreased as the filaments are disposed thereabout due to the fact that radial compressive forces are transmitted to the inner tubular element by the filaments as they are wound thereabout, thereby decreasing the inner diameter of the substantially tubular member. In addition, when a wire is helically wound on a short lead about the filaments to form spaced convolutions providing tooth elements, the wrapping of the wire about the filaments also frequently applies excessive radial forces to the inner tubular member to deform the tubular member and decrease the minimum inner diameter thereof.

When the inner diameter of a member utilized as a conduit has been thus decreased, the proper amount of clearance is not maintained between the motion transmitting core element disposed within the conduit and the inner tubular member of the conduit, and in fact the inner diameter may be reduced to a degree that the motion transmitting core element cannot be inserted into the conduit, thus, making the conduit useless for its intended purpose. In a like manner, when the inner diameter of a cable member has, thus, been decreased, it is difficult, if not impossible, to insert flow conducting means, such as a fluid tube or electrical lead wires, into the cable and even if such a flow conducting means may be inserted into the cable, excessive radial forces may be applied to the flow conducting means so as to deform same.

Accordingly, it is an object and feature of this invention to provide a tubulous member having a constant minimum inner diameter and a variable maximum outer diameter so that means may be disposed about the tubular member so as to decrease the maximum outer diameter while the minimum inner diameter remains constant to form a cable or a conduit.

Another object and feature of this invention is to provide a strip wound with a relatively short lead to form a tubular member having a plurality of convolutions defining a longitudinally-extending central passageway with each of the convolutions having one portion thereof defining the maximum outer diameter of the tubular member which is movable radially inward to vary the maximum outer diameter and a second portion thereof defining the minimum inner diameter of the tubular member which will remain substantially constant as the maximum outer diameter varies so that means may be disposed about the tubular member as the inner diameter remains substantially constant to form a conduit or cable.

A further object and feature of this invention is to provide a method of fabricating a substantially tubular conduit or cable whereby during the fabricating process, means may be tightly disposed about a substantially tubular member without varying the minimum inner diameter thereof.

In general, these and other objects and features of this invention may be attained by utilizing a strip having a substantially V-shaped cross section wound with a relatively short lead to form a plurality of spaced convolutions defining a longitudinally-extending central passageway into which the apex of the V-shaped cross section extends to define the minimum inner diameter of the passageway. A plurality of filaments are then helically wrapped about the convolutions with a relatively long lead to move the edges of the V-shaped strip radially inward as the minimum inner diameter of the passageway formed by the V-shaped strip remains substantially constant. When such an assembly is to be utilized as a conduit, a casing, normally an extruded plastic, is disposed about the filaments. On the other hand, when it is desired to utilize such an assembly as a motion transmitting cable, a wire is frequently wrapped about the helically disposed filaments with a relatively short lead to form spaced convolutions providing tooth elements cooperable with gear means, and the like.

Other objects and attendant advantages of the present invention will be readily appreciated as the same becomes better understood by reference to the following detailed description when considered in connection with the accompanying drawings wherein:

FIGURE 1 is a side elevational view partially broken away and in cross section of a conduit constructed in accordance with the instant invention;

FIGURE 2 is a cross-sectional view taken substantially along line 2—2 of FIGURE 1;

FIGURE 3 is a side elevational view partially broken away of a cable constructed in accordance with the instant invention;

FIGURE 4 is an isometric view of a strip of flexible material which may be utilized in the instant invention;

FIGURE 5 is an isometric view of the strip of flexible material utilized in the instant invention after it has been formed into a V-shaped cross section;

FIGURE 6 is a side elevational view partly in cross section of the V-shaped strip formed into a tubulous member which may be utilized to construct cables or conduits in accordance with the instant invention;

FIGURE 7 is an enlarged cross-sectional view partly broken away of one convolution of the V-shaped strip forming the substantially tubular member of FIGURE 6 and illustrates the position of the edges of the V-shaped strip before means have been disposed thereabout; and FIGURE 8 is an enlarged cross-sectional view of the V-shaped strip of one convolution of the V-shaped strip forming the substantially tubular member of FIGURE 6 and illustrates the position of the edges of the V-shaped strip after means have been disposed thereabout.

Referring now to the drawings, wherein like numerals indicate like or corresponding parts throughout the several views, there is shown, generally at 10, a conduit constructed in accordance with the instant invention, and there is shown, generally at 30, a cable constructed in accordance with the instant invention.

The flexible conduit 10 and the flexible cable 30 both include a monocoil forming an inner tubular or tubulous member, generally shown at 40. The substantially tubular member 40 may be made by forming an elongated flexible strip 41 which may be of any suitable material, metal being preferable. The flat strip 41 is then formed into a strip 42 having a substantially V-shaped cross section with edges 43 and an apex 45. The substantially V-shaped strip 42 is then wound with a relatively short lead to form a plurality of spaced convolutions 46 defining a longitudinally-extending central passageway into which the apex 45 of the V-shaped cross section extends. The maximum outer diameter of the substantially tubular member 40 is defined by the edges 43 of the V-shaped strip 42 and the minimum inner diameter of the substantially tubular member 40 is defined by the apexes 45. Therefore, by wrapping the V-shaped strip 42 with a relatively short lead so that the apex 45 of the strip is on the inside of the wrap, a plurality of convolutions 46 are formed which define a longitudinally-extending central passageway having a diameter defined by the apexes 45 of adjacent convolutions and an outer diameter defined by the edges 43 of adjacent convoluitons 46.

As the V-shaped strip 42 is formed into the substantially tubular member 40, spaces 47 are provided between adjacent convolutions 46. The tubular member 40 has been found very satisfactory when the spaces 47 are approximately .001 of an inch. After means, such as the filaments 50 are disposed about the tubular member 40, the spaces 48 between adjacent convolutions 46 are reduced in proportion to the amount of flattening or inward movement of the edges 43 of the strip 42, and in some instances the spaces 48 may be eliminated when edges 43 of adjacent convolutions 46 are moved inwardly an amount sufficient for adjacent convolutions 46 to abut one another.

Various means may be disposed about the substantially tubular member 40 to complete the assembly; however, a plurality of filaments 50 are preferably wound about the convolutions 46 with a relatively long lead. The filaments 50 may be made of any appropriate material, such as fiberglass, plastic, plastic coated metal, or metal per se. As alluded to previously, there has been a problem heretofore in the fabrication of cables and conduits in that the inner diameter of the inner tubular member of such cables and conduits often varies when means, such as the filaments 50, are disposed about the inner tubular member. The present invention, however solves this problem in that when means such as the filaments 50 are tightly disposed about the substantially tubular member 40, the minimum inner diameter thereof remains substantially constant as the maximum outer diameter thereof may be reduced to compensate for radial forces applied to the inner tubular member by the filaments 50. That is to say, that when the filaments 50 are helically wrapped about the tubular member 40, the inner diameter as defined by the apexes 45 of adjacent convolutions 46 remains substantially constant yet the outer diameter as defined by the edges 43 may be decreased since the V-shaped cross section of the strip forming the tubular member 40 may be flattened by moving the edges 43 radially inward without moving the apexes 45 radially inward. This feature is more clearly illustrated by comparing FIGURES 7 and 8, wherein FIGURE 7 shows a cross section of a V-shaped strip of one convolution 46 before the filaments 50 are disposed thereabout and FIGURE 8 shows a cross section of the V-shaped strip of one convolution after the filaments 50 have been disposed thereabout. The apex 45 of each convolution 46 remains in substantially the same relative position to maintain the minimum inner diameter substantially constant, but the outer edges 43 may move radially inward. That is to say, the strip is to a degree flattened as shown in FIGURE 8, so that the maximum outer diameter is decreased, thus, compensating for radial pressures which may be applied to the tubular member 40 by the filaments 50 so as to maintain the inner diameter of the tubular member 40 substantially constant.

After the filaments 50 have been disposed about the substantially tubular member 40, a conduit 10 may be formed by disposing a casing or jacket 12 about the filaments. The casing 12 is a flexible material, preferably extruded polypropylene or polyethylene. A motion transmitting core element 14 is then inserted into the longitudinally-extending central passageway defined by the apexes 45 of adjacent convolutions 46. The conduit 10 may then be secured to an appropriate support structure such that the motion transmitting core element may be either moved longitudinally within the conduit or rotated within the conduit to perform a remote control function. The motion transmitting core element 14 may be made of any appropriate material, metal being preferred.

Alternatively, a cable 30 may be fabricated by disposing a wire 32 peripherally about the filaments 50. The wire 32 is helically wound about the filaments 50 with a relatively short lead to present spaced convolutions which in turn provide tooth elements cooperable with gear means, or the like, so as to longitudinally move the cable 30. The V-shaped cross section of the strip 42 forming adjacent convolutions 46 of the cable 30 also compensates for any radial forces applied to the adjacent convolutions 46 by the wire 32 in that the edges 43 of the strip 42 may be moved radially inward by pressures applied by the wire 32 yet the inner diameter as defined by the apexes 45 of adjacent convolutions 46 remains substantially constant. An appropriate flow conducting means, generally shown at 33, may be inserted into the substantially tubular member 40 of the cable 30. The flow conducting means may be a tube or the like for passing fluid therethrough or may be an electrical conduit 34 which encases electrical leads 36.

Since in the fabrication of both the conduit 10 and the cable 30 the minimum inner diameter as defined by the apexes 45 of adjacent convolutions 46 of the tubular member 40 remains substantially constant, the motion transmitting core element 14 and the flow conducting means 33 may be respectively inserted into the conduit 10 and the cable 30 so that the proper clearances may be maintained. It is also important to note that due to the inwardly extending apexes 45 the leading edge of the motion transmitting core element 14 or the leading edge of the flow conducting means 33 will not catch or hang up on the edges 43 as the core element 14 and the flow conducting means 34 are respectively inserted into the conduit 10 and into the cable 30.

Although the tubular member 40 of the conduit 10 is illustrated as being wrapped with filaments 50 and encased in the casing 12, it is to be understood that any appropriate means may be disposed about a tubular member 40 to fabricate a cable.

As is evident from the foregoing description, therefore, the present invention provides a novel method for making a substantially tubular shaped conduit or cable utilizing a tubular member having a constant minimum inner diameter and a variable maximum outer diameter.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A single integral tubulous member having a plurality of convolutions each with a portion thereof defining a constant minimum inner diameter and a portion thereof defining a variable maximum outer diameter.

2. A member of the type utilized in cables and conduits comprising: single integral means defining a plurality of convolutions with a longitudinally-extending central passageway, said convolutions including at least one radially movable portion for allowing the outer diameter thereof to be changed as the inner diameter of said passageway is maintained substantially constant.

3. A member of the type utilized in cables and conduits comprising: a single integral strip wound with a relatively short lead to form a tubular member having a plurality of convolutions defining a longitudinally-extending central passageway, said convolutions each having at least one portion thereof radially movable to vary the outer diameter of said tubular member as the inner diameter of said passageway is maintained substantially constant.

4. A flexible member of the type utilized as a cable and a conduit comprising; a strip having a substantially V-shaped cross section including an apex and edges and wound with a relatively short lead to form a plurality of convolutions defining a longitudinally-extending central passageway into which the apex of the V-shaped cross section extends, and means at least partially surrounding said convolutions, said edges being inwardly displaced by said means.

5. A flexible member of the type utilized as a cable and a conduit comprising; a strip having a substantially V-shaped cross section including an apex and edges and wound with a relatively short lead to form a plurality of convolutions defining a longitudinally-extending central passageway into which the apex of the V-shaped cross section extends, and at least one filament helically wound about said convolutions, said edges being inwardly displaced by said means.

6. A flexible member of the type utilized as a cable and a conduit comprising; a strip having a substantially V-shaped cross section wound with a relatively short lead to form a plurality of convolutions defining a longitudinally-extending central passageway into which the apex of the V-shaped cross section extends, a plurality of filaments helically wound about said convolutions, and means at least partially surrounding said filaments.

7. A flexible cable comprising: single integral means defining a longitudinally-extending central passageway, said means including at least one radially movable portion for allowing the outer diameter thereof to be changed as the inner diameter of said passageway is maintained substantially constant, a plurality of filaments helically wound about said means with a relatively long lead, and a peripherally disposed wire helically wound about said filaments with a relatively short lead and presenting spaced convolutions providing tooth elements cooperable with gear means and the like.

8. A flexible conduit comprising; single integral means defining a longitudinally-extending central passageway, said means including at least one radially movable portion for allowing the outer diameter thereof to be changed as the inner diameter of said passageway is maintained substantially constant, at least one filament helically wound about said means, and a casing surrounding said filament.

9. A flexible cable comprising; a strip wound with a relatively short lead to form a tubular member having a plurality of convolutions defining a longitudinally-extending central passageway, said convolutions each having at least one portion thereof radially movable to vary the outer diameter of said tubular member, said convolutions each having a second portion thereof for maintaining a substantially constant inner diameter of said passageway as said outer diameter of said tubular member changes, a plurality of filaments helically wound about said convolutions with a relatively long lead, and a peripherally disposed wire helically wound about said filaments with a relatively short lead and presenting spaced convolutions providing tooth elements cooperable with gear means and the like.

10. A flexible conduit comprising; a strip wound with a relatively short lead to form a tubular member having a plurality of convolutions defining a longitudinally-extending central passageway, said convolutions each having at least one portion thereof radially movable to vary the outer diameter of said tubular member, said convolutions each having a second portion thereof for maintaining a substantially constant inner diameter of said passageway as said outer diameter changes, at least one filament helically wound about said convolutions, and a casing disposed about said filament.

11. A flexible cable comprising; a strip having a substantially V-shaped cross section wound with a relatively short lead to form a plurality of spaced convolutions defining a longitudinally-extending central passageway into which the apex of the V-shaped cross section extends, a plurality of filaments helically wound about said convolutions with a relatively long lead, and a peripherally disposed wire helically wound about said filaments with a relatively short lead and presenting spaced convolutions providing tooth elements cooperable with gear means and the like.

12. A flexible conduit comprising; a strip having a substantially V-shaped cross section wound with a relatively short lead to form a plurality of spaced convolutions defining a longitudinally-extending central passageway into which the apex of the V-shaped cross section extends, a plurality of filaments helically wound about said convolutions with a relatively long lead, and a casing surrounding said filaments.

13. A remote control assembly comprising; a strip having a substantially V-shaped cross section wound with a relatively short lead to form a plurality of spaced convolutions defining a longitudinally-extending central passageway into which the apex of the V-shaped cross section extends, a plurality of filaments helically wound about said convolutions with a relatively long lead, a casing surrounding said filaments, and motion transmitting means disposed for movement in said passageway.

14. A flexible cable comprising; a strip having a substantially V-shaped cross section wound with a relatively short lead to form a plurality of spaced convolutions defining a longitudinally-extending central passageway into which the apex of the V-shaped cross section extends, a plurality of wire means helically wound about said convolutions with a relatively long lead, and a peripherally disposed wire helically wound about said wire means with a relatively short lead and presenting spaced convolutions providing tooth elements cooperable with gear means and the like.

15. A flexible cable comprising; a strip having a substantially V-shaped cross section wound with a relatively short lead to form a plurality of spaced convolutions defining a longitudinally-extending central passageway into which the apex of the V-shaped cross section extends, a plurality of wire means helically wound about said convolutions with a relatively long lead, a peripherally disposed wire helically wound about said wire means with a relatively short lead and presenting spaced convolutions providing tooth elements cooperable with gear means and the like, and means disposed in said central passageway.

16. A flexible cable comprising; a strip having a substantially V-shaped cross section wound with a relatively short lead to form a plurality of spaced convolutions defining a longitudinally-extending central passageway into which the apex of the V-shaped cross section extends, a plurality of wire means helically wound about said convolutions with a relatively long lead, a peripherally disposed wire helically wound about said wire means with a relatively short lead and presenting spaced convolutions providing tooth elements cooperable with gear means and the like, and flow conducting means disposed in said central passageway.

17. The method of making a flexible member of the type utilized as a cable and a conduit comprising the steps of; forming a flexible strip having a substantially V-shaped cross section, wrapping said V-shaped strip with a relatively short lead to form a tubular member having a plurality of convolutions defining a longitudinally-extending central passageway into which the apex of the V-shaped strip extends to define the inner diameter of the tubular member, and disposing means about said convolutions to move the edges of the V-shaped strip radially inward as the inner diameter of the tubular member formed by the V-shaped strip remains substantially constant.

18. The method of making a flexible member of the type utilized as a cable and a conduit comprising the steps of; forming a flexible strip having a substantially V-shaped cross section, wrapping said V-shaped strip with a relatively short lead so that the apex of the V-shaped strip is on the inside of the wrap to form a plurality of convolutions defining a longitudinally-extending central passageway, wrapping a plurality of filaments helically about said convolutions with a relatively long lead, and disposing means about said filaments.

19. The method of making a flexible member of the type utilized as a cable and a conduit comprising the steps of; forming a flexible strip having a substantially V-shaped cross section, wrapping said V-shaped strip with a relatively short lead to form a tubular member having a plurality of convolutions defining a longitudinally-extending central passageway into which the apex of the V-shaped strip extends to define the inner diameter of the tubular member, wrapping a plurality of filaments helically about said convolutions with a relatively long lead to move the edges of the V-shaped strip radially inward as the inner diameter of the tubular member formed by the V-shaped strip remains substantially constant, and disposing means about said filaments.

20. The method of making a flexible conduit comprising the steps of; forming a flexible strip having a substantially V-shaped cross section, wrapping said V-shaped strip with a relatively short lead to form a tubular member having a plurality of convolutions defining a longitudinally-extending central passageway into which the apex of the V-shaped strip extends to define the inner diameter of the tubular member, wrapping a plurality of filaments helically about said convolutions with a relatively long lead to move the edges of the V-shaped strip radially inward as the inner diameter of the tubular member formed by the V-shaped strip remains substantially constant, and forming a casing about said filaments.

21. The method of making a flexible conduit comprising the steps of; forming a flexible strip having a substantially V-shaped cross section, wrapping said V-shaped strip with a relatively short lead so that the apex of the V-shaped strip is on the inside of the wrap to form a plurality of convolutions defining a longitudinally-extending central passageway, wrapping a plurality of filaments helically about said convolutions with a relatively long lead so that said strip is at least partially flattened as the inner diameter of the central passageway as defined by the apex of the V-shaped strip remains substantially constant, and forming a casing about said filaments.

22. The method of making a flexible conduit comprising the steps of; forming a flexible strip having a substantially V-shaped cross section, wrapping said V-shaped strip with a relatively short lead so that the apex of the V-shaped strip is on the inside of the wrap to form a plurality of convolutions defining a longitudinally-extending central passageway, wrapping a plurality of filaments helically about said convolutions with a relatively long lead, and forming a casing about said filaments.

23. A method of making a remote control assembly comprising the step of; forming a substantially flat strip of flexible material; bending said strip into a substantially V-shaped cross section; wrapping said V-shaped strip with a relatively short lead to form a plurality of convolutions defining a longitudinally-extending central passageway into which the apex of the V-shaped strip extends; wrapping a plurality of wire means helically about said convolutions with a relatively long lead; forming a casing about said wire means; and inserting a motion transmitting core element into said passageway.

24. The method of making a flexible cable comprising the steps of; forming a flexible strip having a substantially V-shaped cross section, wrapping said V-shaped strip with a relatively short lead to form a tubular member having a plurality of convolutions defining a longitudinally-extending central passageway into which the apex of the V-shaped strip extends to define the inner diameter of the tubular member, wrapping a plurality of filaments helically about said convolutions with a relatively long lead to move the edges of the V-shaped strip radially inward as the inner diameter of the tubular member formed by the V-shaped strip remains substantially constant, and wrapping a means helically about said filaments with a relatively short lead to form spaced convolutions.

25. The method of making a flexible cable comprising the steps of; forming a flexible strip having a substantially V-shaped cross section, wrapping said V-shaped strip with a relatively short lead so that the apex of the V-shaped strip is on the inside of the wrap to form a plurality of convolutions defining a longitudinally-extending central passageway, wrapping a plurality of filaments helically about said convolutions with a relatively long lead so that said strip is at least partially flattened as the inner diameter of the central passageway as defined by the apex of the V-shaped strip remains substantially constant, and wrapping a means helically about said filaments with a relatively short lead to form spaced convolutions providing tooth elements cooperable with gear means and the like.

26. The method of making a flexible cable comprising the steps of; forming a flexible strip having a substantially V-shaped cross section, wrapping said V-shaped strip with a relatively short lead so that the apex of the V-shaped strip is on the inside of the wrap to form a plurality of convolutions defining a longitudinally-extending central passageway, wrapping a plurality of filaments helically about said convolutions with a relatively long lead, and wrapping a wire helically about said filaments with a relatively short lead to form spaced convolutions providing tooth elements cooperable with gear means and the like.

27. A method of making a flexible cable comprising the steps of; forming a substantially flat strip of flexible material; bending said strip into a substantially V-shaped cross section; wrapping said V-shaped strip with a relatively short lead to form a plurality of convolutions defining a longitudinally-extending central passageway into which the apex of the V-shaped strip extends; wrapping a plurality of wire means helically about said convolutions with a relatively long lead; wrapping a wire helically about said wire means with a relatively short lead to form spaced convolutions providing tooth elements cooperable with gear means and the like; and inserting a flow conducting means into said passageway.

References Cited

UNITED STATES PATENTS

| | | | |
|---|---|---|---|
| 616,612 | 12/1898 | Greenfield | 138—134 |
| 996,999 | 7/1911 | Mulconroy et al. | 138—134 |
| 1,475,344 | 11/1923 | Judson | 74—490 |
| 1,674,623 | 6/1928 | Claus | 74—490 |
| 1,910,300 | 5/1933 | Marles | 74—490 X |
| 1,959,692 | 5/1934 | Sneed | 74—501 |
| 2,768,919 | 10/1956 | Bjorksten et al. | |
| 3,063,303 | 11/1962 | Cadwallader | 74—501 |
| 3,184,986 | 5/1965 | Kompanek et al. | 74—501 |

FOREIGN PATENTS

| | | |
|---|---|---|
| 442,138 | 1/1936 | Great Britain. |

MILTON KAUFMAN, *Primary Examiner.*

FRED C. MATTERN, *Examiner.*

C. F. GREEN, *Assistant Examiner.*